(12) United States Patent
McGarvey et al.

(10) Patent No.: US 7,694,329 B2
(45) Date of Patent: *Apr. 6, 2010

(54) SECURE DELEGATION USING PUBLIC KEY AUTHENTICATION

(75) Inventors: John R. McGarvey, Apex, NC (US); David Kuehr-McLaren, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1 day.

This patent is subject to a terminal disclaimer.

(21) Appl. No.: 12/186,420

(22) Filed: Aug. 5, 2008

(65) Prior Publication Data

US 2009/0055902 A1 Feb. 26, 2009

Related U.S. Application Data

(63) Continuation of application No. 09/921,536, filed on Aug. 3, 2001, now Pat. No. 7,428,749.

(51) Int. Cl.
*H04L 9/12* (2006.01)
*H04L 9/32* (2006.01)
*G06F 7/04* (2006.01)
*G06F 15/16* (2006.01)
*H04L 9/30* (2006.01)

(52) U.S. Cl. .............................. 726/8; 726/4; 713/176; 713/155; 713/168

(58) Field of Classification Search .................. 726/4, 726/8; 713/176, 155, 168
See application file for complete search history.

(56) References Cited

U.S. PATENT DOCUMENTS

| 5,369,705 A | 11/1994 | Bird et al. |
|---|---|---|
| 5,535,276 A | 7/1996 | Ganesan |
| 5,586,260 A | 12/1996 | Hu |
| 5,666,415 A | 9/1997 | Kaufman |
| 5,729,608 A | 3/1998 | Janson et al. |
| 5,778,065 A | 7/1998 | Hauser et al. |
| 5,931,947 A | 8/1999 | Burns et al. |
| 6,052,784 A | 4/2000 | Day |
| 6,064,736 A | 5/2000 | Davis et al. |

(Continued)

FOREIGN PATENT DOCUMENTS

EP 1168763 A2 1/2002

(Continued)

OTHER PUBLICATIONS

Schneier, Bruce; "Applied Cryptography Protocols, Algorithms, and Source Code in C, 2nd Edition"; 1996; pp. 34-39; John Wiley and Sons.

(Continued)

*Primary Examiner*—Matthew T Henning
(74) *Attorney, Agent, or Firm*—Stevens & Showalter LLP

(57) ABSTRACT

A client is impersonalized to a plurality of servers using a middle-tier server. A common nonce associated with each of the plurality of servers is obtained and the common nonce is provided to the client. The common nonce signed by the client is received at the middle-tier server and provided as a signature for transactions from the client to the plurality of servers so as to authenticate the client to the plurality of servers.

20 Claims, 10 Drawing Sheets

U.S. PATENT DOCUMENTS

| | | | |
|---|---|---|---|
| 6,067,623 | A | 5/2000 | Blakley et al. |
| 6,148,405 | A | 11/2000 | Liao et al. |
| 6,829,356 | B1 | 12/2004 | Ford |
| 6,934,842 | B2 | 8/2005 | Okamoto et al. |
| 6,938,158 | B2 | 8/2005 | Azuma |
| 6,985,583 | B1 | 1/2006 | Brainard et al. |
| 7,039,714 | B1 | 5/2006 | Blakley, III et al. |
| 7,062,781 | B2 | 6/2006 | Shambroom |
| 7,093,019 | B1 | 8/2006 | Bertani et al. |
| 7,249,176 | B1 | 7/2007 | Salas et al. |
| 7,430,757 | B1 * | 9/2008 | Chari et al. ............... 726/4 |
| 2001/0055388 | A1 | 12/2001 | Kaliski |
| 2002/0104006 | A1 | 8/2002 | Boate et al. |
| 2002/0150253 | A1 | 10/2002 | Brezak et al. |
| 2003/0014631 | A1 | 1/2003 | Sprague |
| 2003/0018913 | A1 | 1/2003 | Brezak et al. |

FOREIGN PATENT DOCUMENTS

| | | | |
|---|---|---|---|
| WO | 99/56194 | A2 | 11/1999 |

OTHER PUBLICATIONS

Menezes, A et al.; "Handbook of Applied Cryptography (Discrete Mathematics and Its Applications)"; 1997; pp. 397-398, and 559-560; CRC Press.

U.S. Appl. No. 12/186,426, filed Aug. 5, 2008 entitled Secure Delegation Using Public Key Authentication.

* cited by examiner

SECURE DELEGATION USING PUBLIC KEY AUTHENTICATION

CROSS REFERENCE TO RELATED APPLICATION

This application claims the benefit of U.S. patent application Ser. No. 09/921,536 entitled SECURE DELEGATION USING PUBLIC KEY AUTHENTICATION, filed Aug. 3, 2001, the entire disclosure of which is incorporated by reference herein. Also, this application is related to U.S. patent application Ser. No. 12/186,426, filed concurrently herewith entitled "SECURE DELEGATION USING PUBLIC KEY AUTHENTICATION", the entire disclosure of which is incorporated by reference herein.

BACKGROUND OF THE INVENTION

Networked computer applications are often deployed using a "tiered" model. In this model, the originator of a request for a unit of work (also referred to as a "principal") typically initiates that work via a client program (first tier), which then communicates to a web server, or similar second tier server (also referred to as a middle-tier server), which itself communicates, on behalf of the request originator, to other middle-tier servers and/or to third or fourth tier servers such as database servers or other resource managers. When the request is processed by the resource managers, they, typically, evaluate whether the request originator has been authenticated and whether they are authorized to perform the unit of work. The resource managers, typically, also record access by the originator of the request in appropriate audit logs.

Such a tiered approach to networked applications may create a need for the secure propagation of security credentials of the request originator through each of the tiers of the application. In such propagation of secure credentials, the request originator delegates to the middle-tier servers the authority to access other servers on their behalf. Thus, the secure propagation of the credentials of the request originator (the requesting "principal") may be referred to as "delegation" or "impersonation."

One conventional approach for asynchronous message based authentication is to create a digital signature for the message. The digital signature is based on a public/private key pair. An example of such a digital signature approach to authentication is Public Key Infrastructure (PKI) authentication. In PKI, typically, a nonce, which may, for example, be a 60 bit random number, is generated by a party, such as a server, and provided to the client. The client signs the nonce with its digital signature and returns the signed nonce to the server. Typically, the server evaluates the digital signature of the client by decrypting the signed nonce with the public key of the client, which may be obtained from a certificate associated with the client, and comparing the decrypted nonce to the nonce originally sent. If the nonces are the same, the signature is authentic. In such a manner, the server may be assured of the authenticity of the client. This manner of authenticating the client is used in a variety of computer protocols, including Secure Sockets Layer (SSL) and Transport Layer Security (TLS).

One difficulty with such a PKI authentication procedure is that it may be difficult to provided delegation of client authentication in certain circumstances. For example, a request from a principal through a client may pass through a middle-tier server which, in response to the request, accesses multiple third or fourth tier servers (also referred to as back-end servers). In such a case, the middle-tier server may need to authenticate the principal or the client to multiple back-end servers. Such a delegation of authentication may difficult in light of the multiple servers for which the client may need authentication.

BRIEF SUMMARY OF THE INVENTION

Aspects of the present invention provide for impersonating a client to a plurality of servers. A middle tier server obtains a common nonce that is created based at least in part upon a pre-nonce contribution from each of a plurality of back-end servers, wherein the common nonce is generated from an entity other than the client that the middle tier server is to impersonate or the plurality of back-end servers that the middle tier server is to interact with on behalf of the client. The middle tier server receives a request from the client for a transaction with at least one of the plurality of back-end servers. The middle tier server also provides the common nonce from the middle tier server to the client and means for receiving the common nonce signed by the client with the client's digital signature at the middle-tier server. Further, the middle tier server impersonates the client by interacting with a selected one of the plurality of back-end servers for implementation of the client request on behalf of the client by providing the signed common nonce and the client request from the middle tier server to at least one of the plurality of back-end servers so as to authenticate the client to the plurality of servers for implementation of the client request on behalf of the client.

Further embodiments of the present invention provide for authenticating a client. A middle tier server that is impersonating the client receives a pre-nonce token and a common nonce that has been signed by a client at a back-end server of a plurality of back-end servers. The pre-nonce token comprises a combination of pre-nonce contributions from the plurality of back-end servers. The common nonce is created by hashing the pre-nonce token and is generated from an entity other than the client that the middle tier server is impersonating or the plurality of back-end servers that the middle tier server is to interact with on behalf of the client. The client is authenticated based on the received signed common nonce and the pre-nonce token is hashed using the same hashing technique used to create the common nonce from the pre-nonce token. The middle tier server is verified based upon a comparison of the received common nonce and hashed value of the received pre-nonce token.

DETAILED DESCRIPTION OF THE INVENTION

Figure 1A:
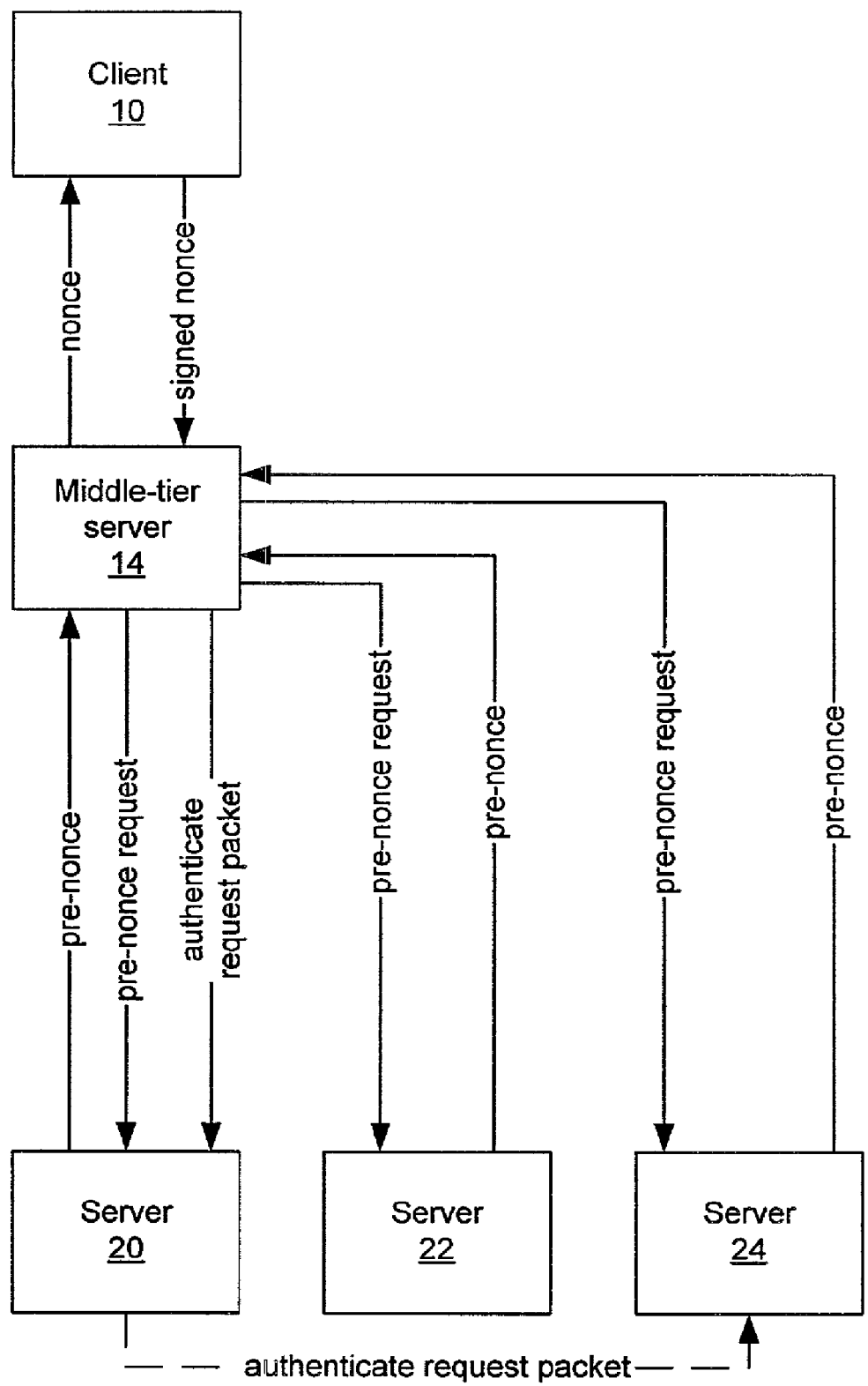
FIG. 1A is a block diagram illustrating a system incorporating embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language such as Java.RTM., Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Various embodiments of the present invention will now be described with reference to the figures. As will be appreciated by those of skill in the art in light of the present disclosure, while embodiments of the present invention are described primarily with reference to PKI, embodiments of the present invention may also provide for authentication of messages utilizing other security protocols which utilize a nonce.

FIG. 1A illustrates a network configuration where multiple back-end servers 20, 22 and 24 are accessed by a middle-tier server 14 in which embodiments of the present invention may be incorporated. As seen in FIG. 1A, a principal may use a client data processing system 10 to access a server, such as the back-end servers 20, 22 and 24. Thus, the client 10 and the back-end servers 20, 22 and 24 are endpoints respectively for requesting and providing a work unit. The servers between these endpoints may be referred to as "middle-tier servers." In the exemplary system illustrated in FIG. 1A, the client 10 communicates with one or more middle-tier servers 14 to access the back-end servers 20, 22 and 24. The exemplary single middle-tier server 14 is delegated authority by the client 10 to act on its behalf in accessing the back-end servers 20, 22 and 24 through the use of a common nonce as described herein.

As is further seen in FIG. 1A, the middle-tier server 14 requests a pre-nonce contribution from each of the back-end servers 20, 22 and 24. In response to these requests, the back-end servers 20, 22 and 24 send pre-nonce contributions to the middle-tier server 14. The middle-tier server combines the pre-nonce contributions from the back-end servers 20, 22 and 24 and creates a common nonce. The nonce is provided to the client 10 for use by the client 10 in accessing the back-end servers 20, 22 and 24. To authenticate itself, the client 10 signs the nonce with its digital signature and returns the signed nonce to the middle-tier server which provides the signed nonce to the back-end servers 20, 22 and 24 when access of these servers on behalf of the client 10 is desired.

As illustrated in FIG. 1A, the signed nonce may be provided to the backend servers 20, 22 and 24 as part of an authenticated request packet which may include, for example, the signed nonce, the request from the client, the pre-nonce token and/or the client certificate. Furthermore, as illustrated by the dashed lines in FIG. 1A, the back-end server 20 may, optionally, forward the authenticated request packet to other servers, such as the back-end server 24. Thus, further downstream chaining of the delegated authority may also be provided.

Figure 1B:
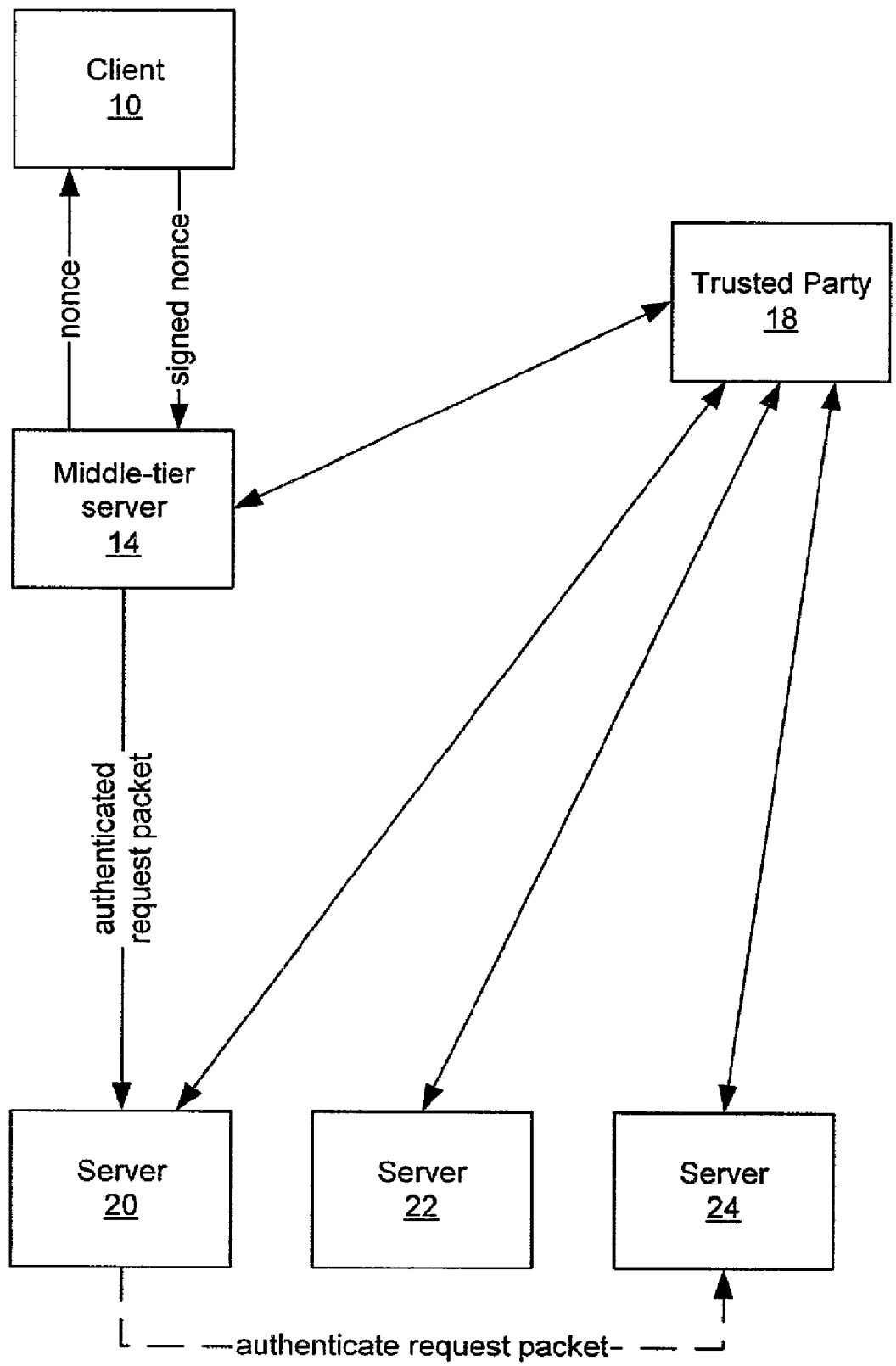
FIG. 1B is a block diagram illustrating a system incorporating alternative embodiments of the present invention.

FIG. 1B illustrates an alternative embodiment of the present invention where the common nonce is provided by a trusted third party 18 such that the common nonce may be authenticated as being from the trusted third party 18 by each of the middle-tier server 14 and the back-end servers 20, 22 and 24. Such a common nonce may be generated by the trusted third party 18. The nonce may be, but is not required to be, generated based on input from the back-end servers 20, 22 and 24. The nonce from the trusted third party 18 is provided to the client 10 for use by the client 10 in accessing the back-end servers 20, 22 and 24. To authenticate itself, the client 10 signs the nonce with its digital signature and returns the signed nonce to the middle-tier server which provides the signed nonce to the back-end servers 20, 22 and 24 when access to these servers on behalf of the client 10 is desired.

As with the embodiments illustrated in FIG. 1A, in the embodiments illustrated in FIG. 1B the signed nonce may be provided to the back-end servers 20, 22 and 24 as part of an authenticated request packet which may include, for example, the signed nonce, the request from the client, the pre-nonce token and/or the client certificate. Furthermore, as illustrated by the dashed lines in FIG. 1B, the back-end server 20 may, optionally, forward the authenticated request packet to other servers, such as the back-end server 24. Thus, in the embodiments illustrated in FIG. 1B further downstream chaining of the delegated authority may also be provided.

While FIGS. 1A and 1B are illustrated as having a single client 10 and a single middle-tier server 14 and three back-end servers 20, 22 and 24, other combinations, including multiple clients and/or servers, may also be provided. Thus the present invention should not be construed as limited to the configurations of FIGS. 1A and 1B but is intended to cover all configurations capable of carrying out the operations described herein.

Figure 2:
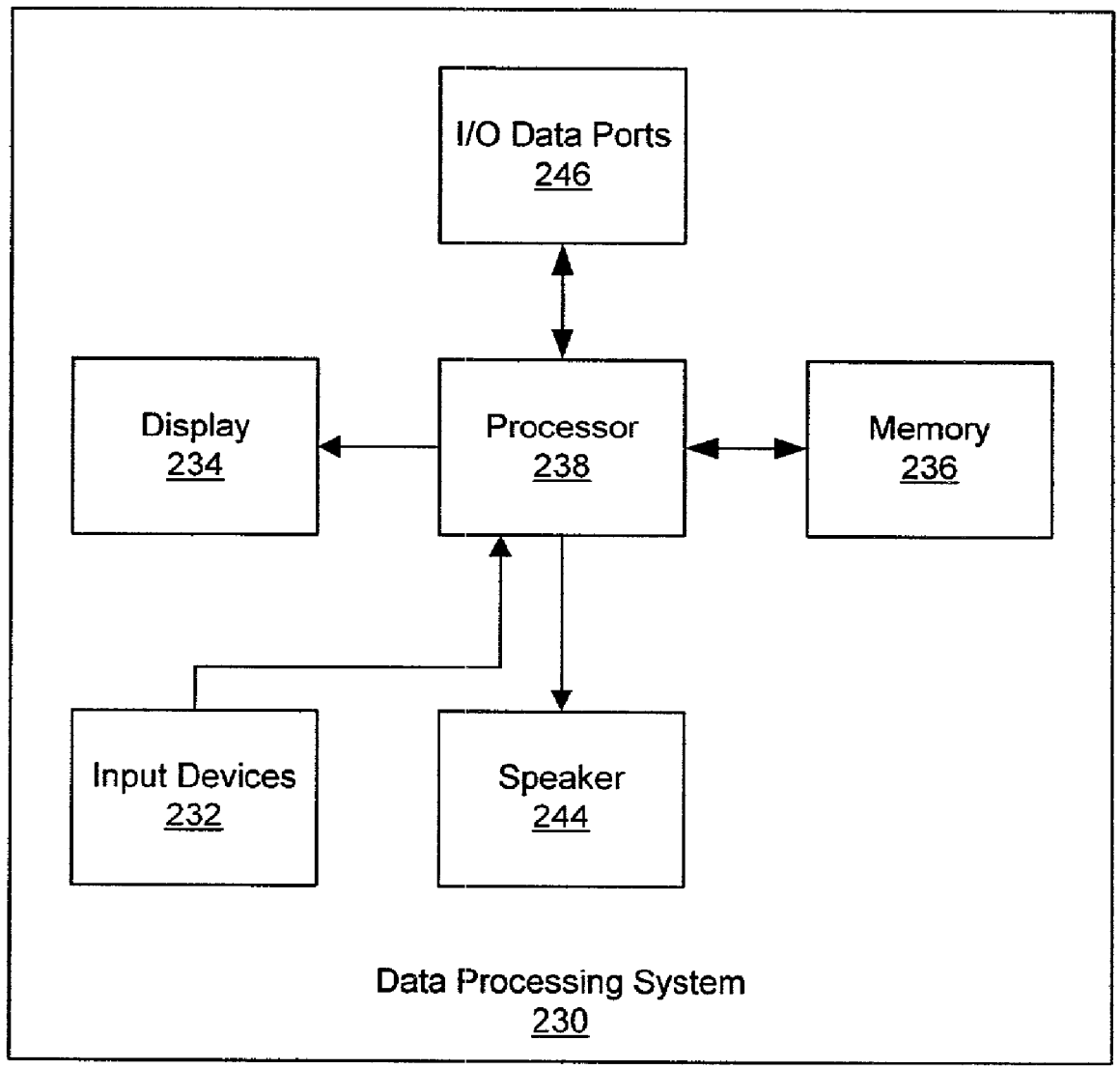
FIG. 2 is a block diagram of a data processing system according to embodiments of the present invention.
Figure 3:
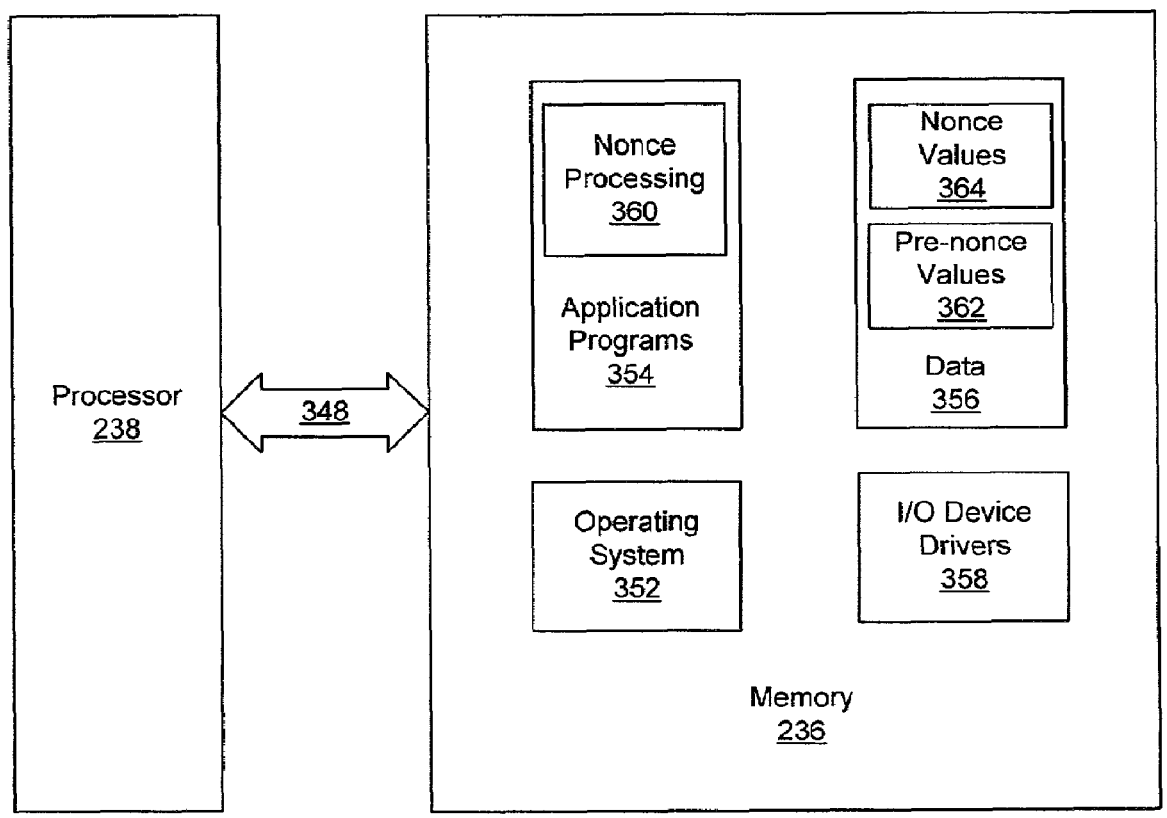
FIG. 3 is a more detailed block diagram of a data processing system according to embodiments of the present invention.

FIG. 2 illustrates an exemplary embodiment of a data processing system 230 suitable for providing a client, a middle tier server, a trusted third party and/or a back-end server in accordance with embodiments of the present invention. The data processing system 230 typically includes input device(s) 232 such as a keyboard or keypad, a display 234, and a memory 236 that communicate with a processor 238. The data processing system 230 may further include a speaker 244, and an I/O data port(s) 246 that also communicate with the processor 238. The I/O data ports 246 can be used to transfer information between the data processing system 230 and another computer system or a network. These components may be conventional components such as those used in many conventional data processing systems which may be configured to operate as described herein FIG. 3 is a block diagram of embodiments of data processing systems that illustrates systems, methods, and computer program products in accordance with embodiments of the present invention. The processor 238 communicates with the memory 236 via an address/data bus 348. The processor 238 can be any commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash memory, SRAM, and DRAM.

As shown in FIG. 3, the memory 236 may include several categories of software and data used in the data processing system 230: the operating system 352; the application programs 354; the input/output (I/O) device drivers 358; and the data 356. As will be appreciated by those of skill in the art, the operating system 352 may be any operating system suitable for use with a data processing system, such as OS/2, AIX or System390 from International Business Machines Corporation, Armonk, N.Y., Windows95, Windows98 or Windows2000 from Microsoft Corporation, Redmond, Wash., Unix or Linux configured to support an TCP/IP-based protocol connection. The I/O device drivers 358 typically include software routines accessed through the operating system 352 by the application programs 354 to communicate with devices such as the I/O data port(s) 246, the data storage 235 and certain memory 236 components. The application programs 354 are illustrative of the programs that implement the various features of the data processing system 230 and preferably include at least one application which supports operations according to embodiments of the present invention. Finally, the data 356 represents the static and dynamic data used by the application programs 354, the operating system 352, the I/O device drivers 358, and other software programs that may reside in the memory 236.

As is further seen in FIG. 3, the application programs 354 may include a nonce processing module 360. The nonce processing module 360 may carry out the operations described herein for management, generation and/or use of common nonces for accessing multiple servers. The data portion 356 of memory 236, as shown in the embodiments of FIG. 3, may include nonce values 364 and, in certain embodiments, pre-nonce values 362. The nonce values 364 and the pre-nonce values 362 may be utilized by the nonce processing module 360 as described herein for authentication of a client to multiple servers.

While the present invention is illustrated, for example, with reference to the nonce processing module 360 being an application program in FIG. 3, as will be appreciated by those of skill in the art, other configurations may also be utilized while still benefiting from the teachings of the present invention. For example, the nonce processing module 360 may also be incorporated into the operating system 352, the I/O device drivers 358 or other such logical division of the data processing system 230. Thus, the present invention should not be construed as limited to the configuration of FIG. 3 but is intended to encompass any configuration capable of carrying out the operations described herein.

Operations according to embodiments of the present invention, including operations of the middle-tier server 14 and the back-end servers 20, 22 and 24 will now be described with reference to the exemplary network diagram of FIGS. 1A and 1B and the flowcharts of FIGS. 4 through 9. However, as will be appreciated by those of skill in the art, the networks illustrated in FIGS. 1A and 1B are exemplary only. Embodiments of the present invention may be utilized in other network configurations.

Figure 4:
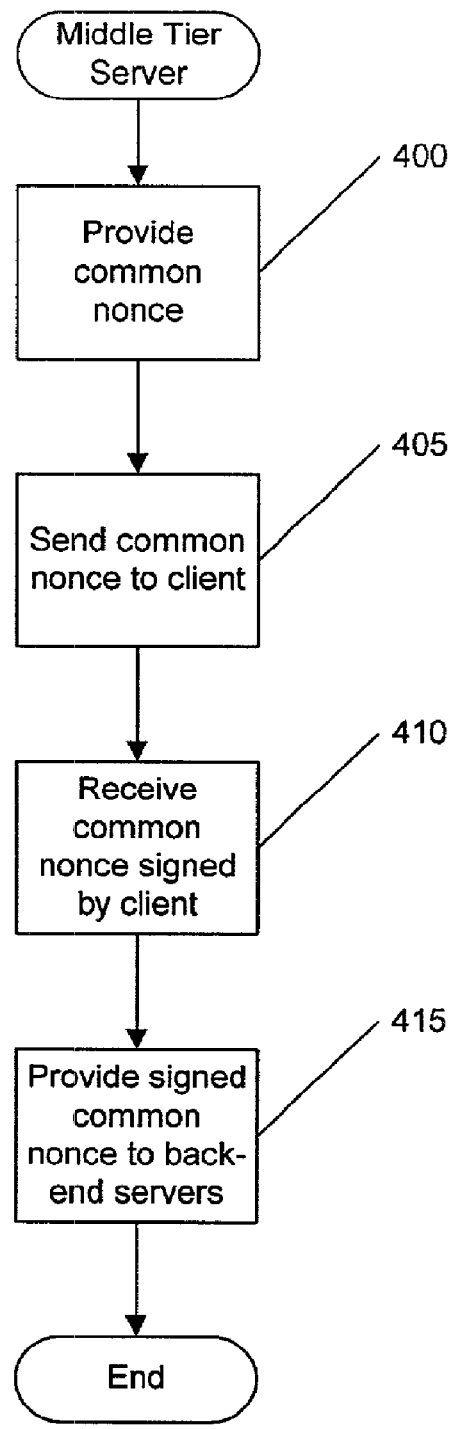
FIG. 4 is a flowchart illustrating operations of a middle-tier server according to embodiments of the present invention.

As seen in FIG. 4, a middle-tier server 14 according to embodiments of the present invention provides a common nonce to the client 10 which may be used to access to each of the plurality of back-end servers 20, 22 and 24 (block 400). Such a common nonce may be generated by the middle-tier server 14 (FIG. 1A) or provided by a trusted third party 18 (FIG. 1B) or other server. In either case, the middle-tier server 14 sends the common nonce to the client 10 requesting access to one or more of the back-end servers 20, 22 and 24 (block 405). The middle-tier server 14 receives back from the client 10 the common nonce signed with the digital signature of the client 10 (block 410). The middle-tier server 14 uses the signed common nonce to access the one or ones of the back-end servers 20, 22 and 24 on behalf of the client 10 by providing the signed common nonce to the back-end servers for authentication (block 415).

Figure 5:
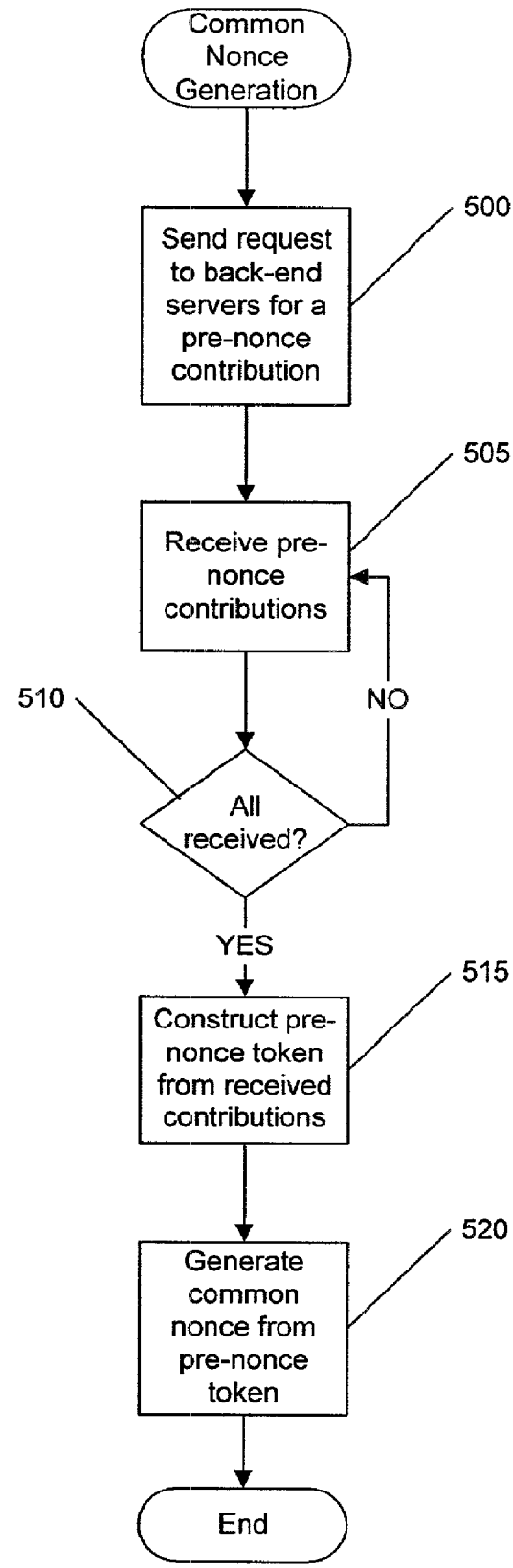
FIG. 5 is a flowchart illustrating operations for common nonce generation according to embodiments of the present invention.
Figure 6:
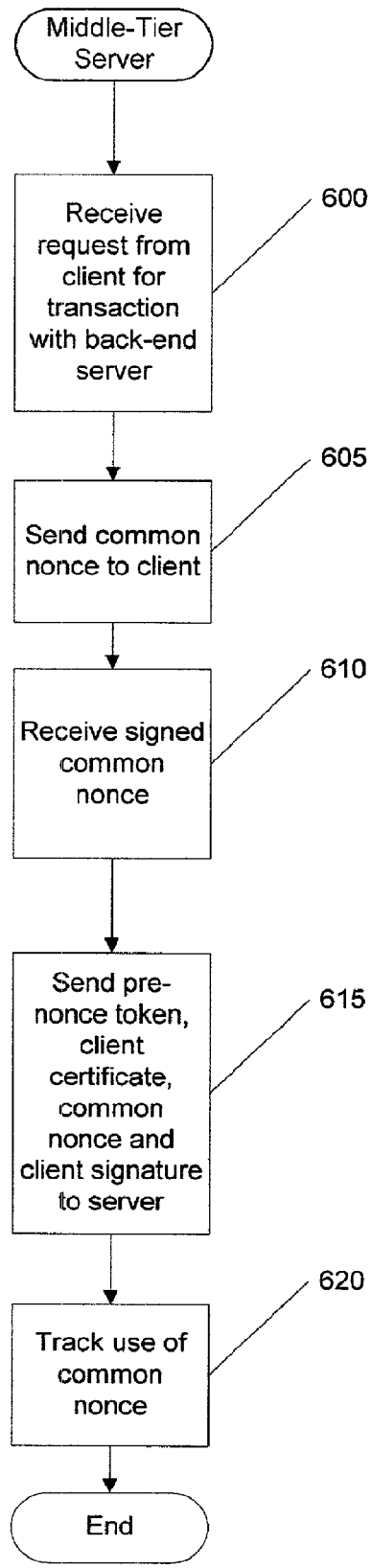
FIG. 6 is a more detailed flowchart of operations of a middle-tier server according to further embodiments of the present invention.
Figure 7:
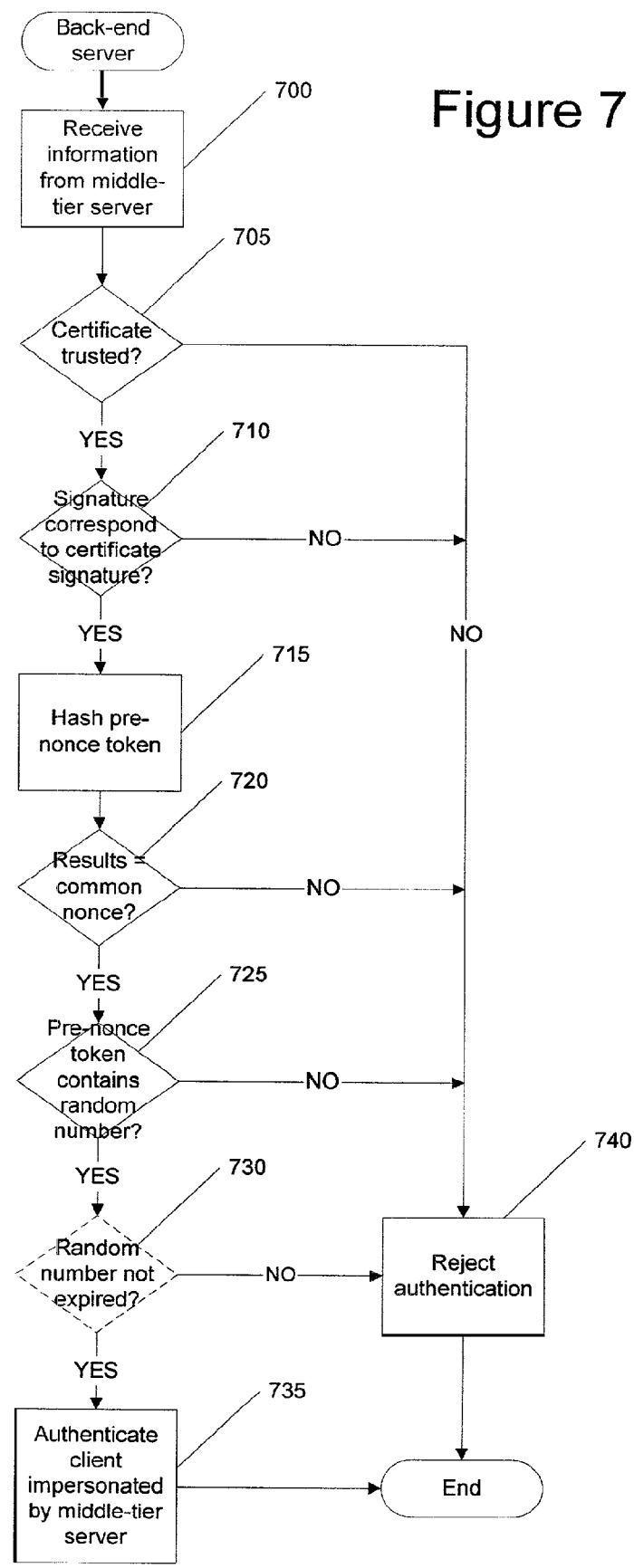
FIG. 7 is a flowchart illustrating operations of a back-end server according to embodiments of the present invention.

FIGS. 5 through 7 illustrate operations carried out by the middle-tier server and/or the back-end servers 20, 22 and 24 in the embodiments illustrated in FIG. 1A where the common nonce is generated by a middle-tier server. Alternatively, the operations could be carried out by the trusted third part 18 of FIG. 1B or other server to generate the common nonce which is provided to the middle-tier server 14.

FIG. 5 illustrates operations for the generation of a common nonce according to embodiments of the present invention. As seen in FIG. 5, a request is sent to the back-end servers 20, 22 and 24 to request a pre-nonce contribution from the back-end servers 20, 22 and 24 (block 500). The request may, for example, include an identification of the requester, such as the middle-tier server 14, a timestamp and/or a random number associated with the requestor. The random number may, like a nonce, be a 60 bit value. The request may, optionally, be provided over an encrypted link and may utilize authentication by the requester and/or the receiving server. Furthermore, the request may be provided to one or more of the back-end servers which may obtain and provide pre-nonce contributions for other of the back-end servers.

In response to the request, pre-nonce contributions are received from the back-end servers 20, 22 and 24 (block 505). As described above, the pre-nonce contributions may be received directly from each server or from other servers acting on behalf of the back-end servers. Thus, a pre-nonce contribution is received for each of the back-end servers. Such pre-nonce contributions may, for example, include an identification of the back-end server associated with the pre-nonce contribution and/or a random number associated with the back-end server. The random number may, like a nonce, be a 60 bit value. Optionally, the pre-nonce contributions may include a signature associated with the server. As described below, the back-end server could also maintain a list of random numbers it has provided as a pre-nonce contribution and associate an expiration time with corresponding numbers.

When pre-nonce contributions have been received from all of the back-end servers associated with the common nonce being generated (block 510), a pre-nonce token is created based on all of the received pre-nonce contributions (block 515). Such a pre-nonce token may, for example, be created by concatenating the received pre-nonce contributions. Preferably, such concatenation is done in a predefined manner. The common nonce is generated from the pre-nonce token by, for example, reducing the pre-nonce token to a 60 bit value (block 520). Such a reduction may, for example, be provided by a one-way hash function, such as the SHA or MD5 hash functions, which hash the n-bit pre-nonce token to the 60 bit nonce length of PKI to provide the common nonce.

Optionally, a transaction identification could also be obtained from a trusted back-end server. The transaction identification could be associated with the common nonce and even incorporated into the common nonce generation procedure through the concatenation process. The transaction identification could be utilized to provide an audit trail for tracking usage of the common nonce.

FIG. 6 illustrates operations for use of the common nonce for impersonation of the client 10 according to embodiments of the present invention. As seen in FIG. 6, the middle-tier server 14 receives a request from the client 10 for a transaction with one or more of the back-end servers 20, 22 and 24 (block 600). The middle-tier server 14 sends the common nonce to the client 10 (block 605) which signs the common nonce with its digital signature and returns the signed common nonce as its signature to the middle-tier server 14. The middle-tier server receives the signed common nonce (block 610) and sends the pre-nonce token, client certificate, common nonce and client signature to the back-end server to authenticate the client to the back-end server (block 615). Additionally, as described above, optionally, the middle-tier server 14 may track use of the common nonce (block 620), for example, by use of the transaction identification and creation of a log file or other such tracking mechanism.

FIG. 7 illustrates operations of a back-end server upon receipt of the information from the middle-tier server 14. As seen in FIG. 7, the back-end server receives the information from the middle-tier server 14 (block 700) and determines if the certificate received from the middle-tier server 14 is from a trusted client (block 705). Such a determination may be made using conventional PKI techniques. If the certificate is not from a trusted client (block 705), the information is rejected as not authenticated (block 740). If the certificate is from a trusted client (block 705), it is determined if the signature corresponds to the certificate signature (block 710). Such a determination may be made using conventional PKI techniques for verification of a signature based on a ticket. If the signature does not correspond to the certificate signature (block 710), the information is rejected as not authenticated (block 740).

If the signature corresponds to the certificate signature (block 710), the pre-nonce token is hashed using the same hash technique utilized by the middle-tier server (block 715) and the results are compared to the common nonce (block 720). If the results are not the same as the common nonce (block 720), the information is rejected as not authenticated (block 740). If the results are the same as the common nonce (block 720), the pre-nonce token is evaluated to determine if it contains the random number provided by the back-end server as part of its pre-nonce contribution (block 725). While not illustrated in FIG. 7, if the random number is optionally signed as described above, the digital signature may be evaluated to determine if it is the digital signature of the back-end server. If the signature does not correspond to that of the back-end server the information would be rejected as not authenticated. Returning to FIG. 7, if the random number provided by the back-end server is not present in the pre-nonce token (block 725), the information is rejected as not authenticated (block 740).

Optionally, if the random number is present in the pre-nonce token (block 725) and the random numbers provided by the back-end server have expirations which are tracked by the back-end server, it may be determined if the random number has expired (block 730). If the random number has expired (block 730), the information is rejected as not authenticated (block 740). If the random number has not expired (block 730), the information is accepted as an authenticated client impersonated by the middle-tier server 14 (block 735).

Figure 8:
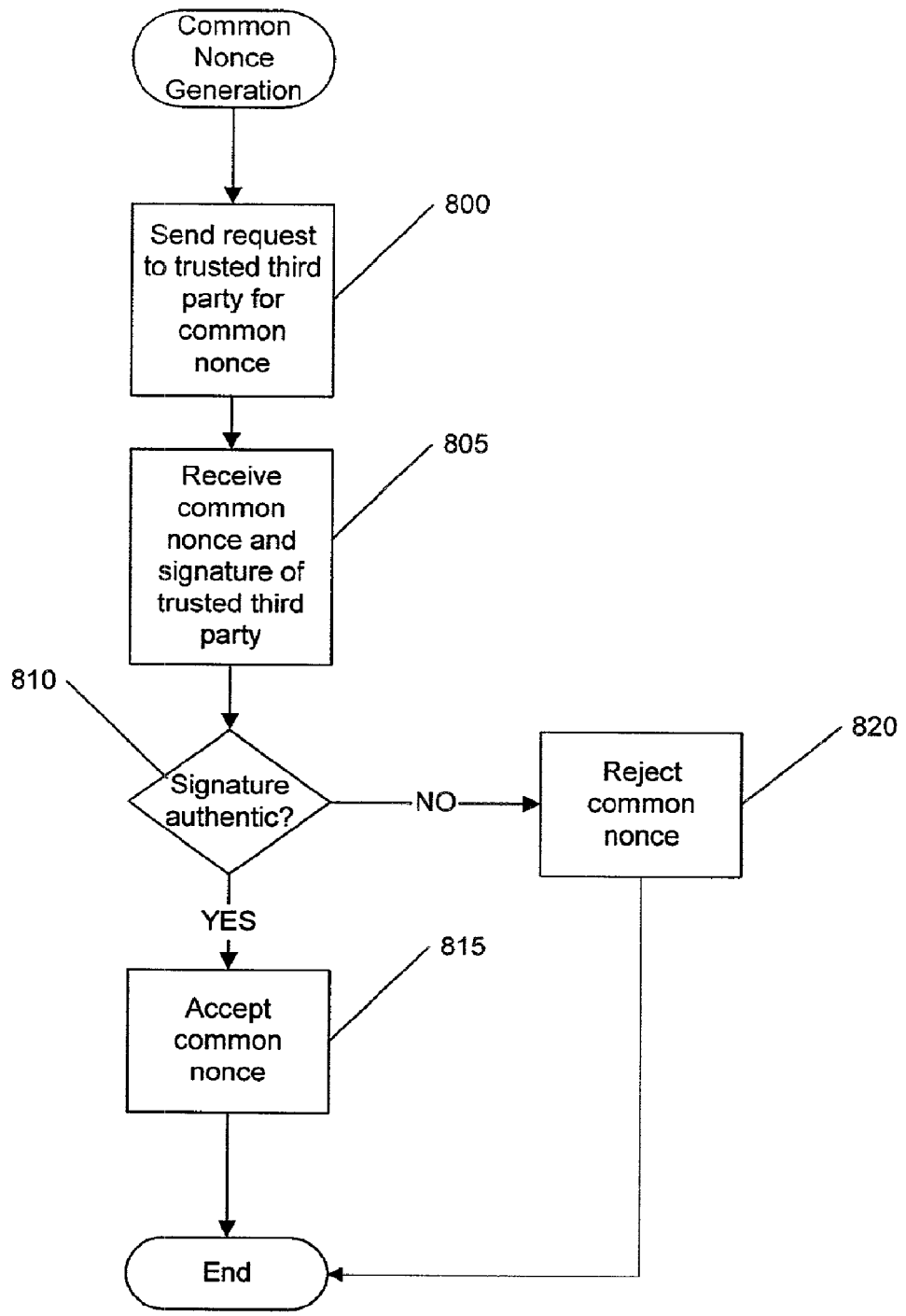
FIG. 8 is a flowchart of operations of a middle-tier server according to alternative embodiments of the present invention.
Figure 9:
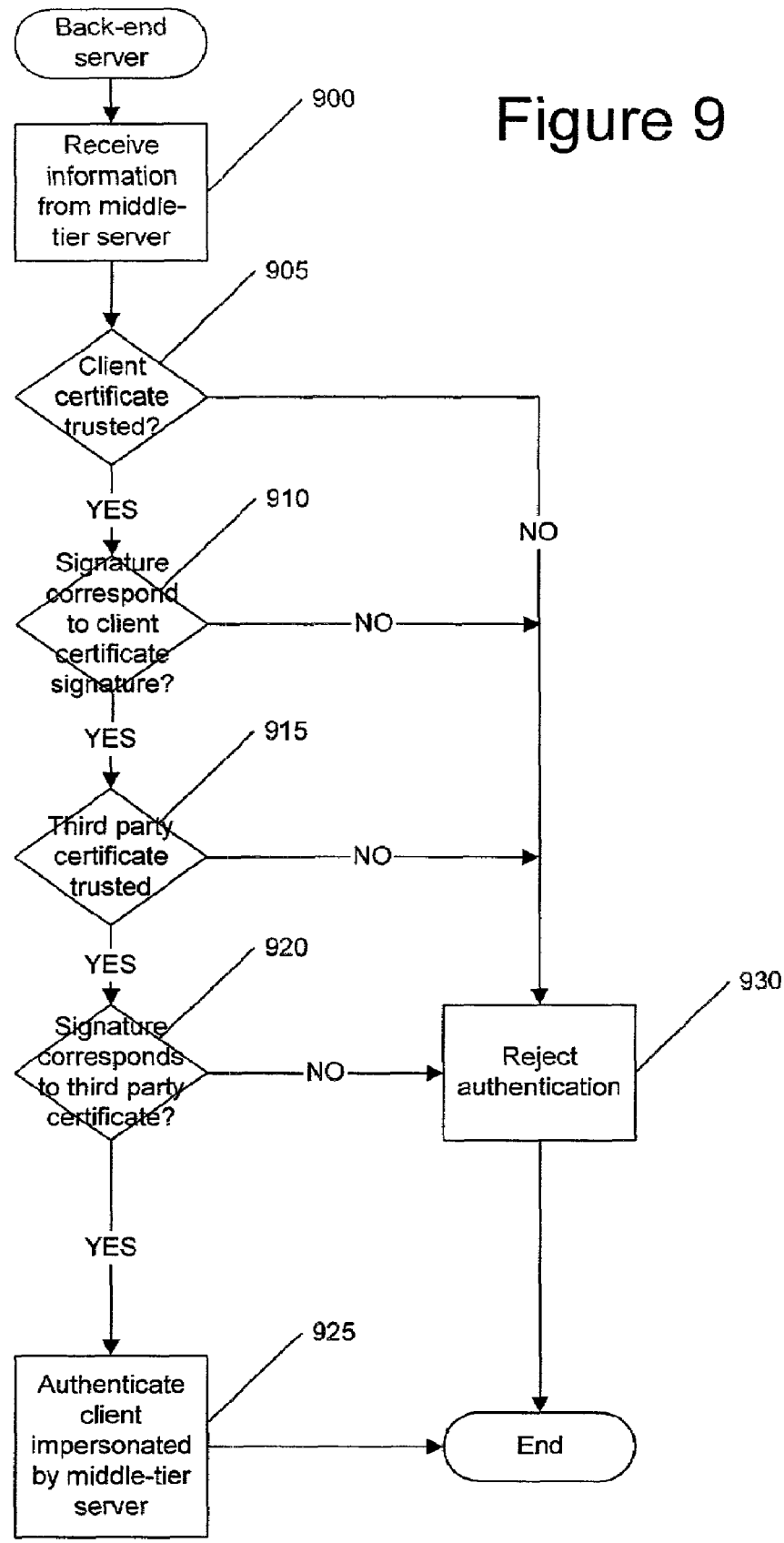
FIG. 9 is a flowchart illustrating operations of a back-end server according to alternative embodiments of the present invention.

FIGS. 8 and 9 illustrate operations according to alternative embodiments of the present invention where the common nonce is obtained from the trusted third party 18. As seen in FIG. 8, the common nonce may be generated by sending a request from the middle-tier server 14 to the trusted third party 18 (block 800). The common nonce and signature of the trusted third party are received (block 805) and it is determined if the signature is authentic (block 810). If the signature is not authentic (block 810), the common nonce is rejected (block 820). If the signature is authentic (block 810), the common nonce is accepted (block 815). The common nonce may be used by the middle-tier server 14 to impersonate the client 10 as described with reference to FIG. 6 with appropriate revision to the information provided to the back-end server so as to provide the signature of the client and the signature of the trusted third party to the back-end server.

FIG. 9 illustrates operations of the back-end server according to alternative embodiments of the present invention. The back-end server receives the information from the middle-tier server 14 (block 900) and determines if the certificate received from the middle-tier server 14 is from a trusted client (block 905). Such a determination may be made using conventional PKI techniques. If the certificate is not from a trusted client (block 905), the information is rejected as not authenticated (block 930). If the certificate is from a trusted client (block 905), it is determined if the signature corresponds to the client certificate signature (block 910). Such a determination may be made using conventional PKI techniques for verification of a signature based on a ticket. If the signature does not correspond to the certificate signature (block 910), the information is rejected as not authenticated (block 930).

If the signature corresponds to the client certificate signature (block 910), it is determined if the third party certificate is from a trusted third party (block 915). If not, the information is rejected as not authenticated (block 930). If the third party certificate is from a trusted third party (block 915), the signature of the common nonce is evaluated to determine if it corresponds to the signature from the trusted third party certificate (block 920). If not, the information is rejected as not authenticated (block 930). If the signature of the common nonce corresponds to the signature of the trusted third party certificate (block 920), the information is accepted as an authenticated client impersonated by the middle-tier server 14 (block 925).

While the present invention has been described, in part, with reference to the back-end servers 20, 22 and 24, as will be appreciated by those of skill in the art in light of the present disclosure, the back-end servers 20, 22 and 24 are illustrative of resource managers in general. Accordingly, embodiments of the present invention may be utilized to securely access resource managers of differing types. The resource managers may include, for example, security policies for carrying out some or all of the operations described above for authentication of requests to access a resource managed by the resource manager.

The flowcharts and block diagrams of FIGS. 1A, 1B and 2 through 9 illustrate the architecture, functionality, and operation of possible implementations of systems, methods and computer program products for authentication according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

Furthermore, in the drawings, certain operations/acts and or blocks which have been indicated as optional are shown in dashed lines. The presence or lack of such a dashed line shall not, however, be construed as requiring any of the elements of the figures other than those necessary to provide the functions, operations and/or acts specified in the claims set forth below.

In the drawings and specification, there have been disclosed typical illustrative embodiments of the invention and, although specific terms are employed, they are used in a generic and descriptive sense only and not for purposes of limitation, the scope of the invention being set forth in the following claims.

What is claimed is:

1. A computer program product for impersonating a client to a plurality of servers, comprising:

a computer usable storage medium having computer readable program code embodied therein, the computer readable program code comprising:

computer readable program code that obtains by a middle tier server, a common nonce that is created based at least in part upon a pre-nonce contribution from each of a plurality of back-end servers, wherein the common nonce is generated from an entity other than the client that the middle tier server is to impersonate or the plurality of back-end servers that the middle tier server is to interact with on behalf of the client;

computer readable program code that receives by the middle tier server, a request from the client for a transaction with at least one of the plurality of back-end servers;

computer readable program code that provides the common nonce from the middle tier server to the client;

computer readable program code that receives the common nonce signed by the client with the client's digital signature at the middle-tier server; and computer readable program code that impersonates the client by the middle tier server interacting with a selected one of the plurality of back-end servers for implementation of the client request on behalf of the client by providing the signed common nonce and the client request from the middle tier server to at least one of the plurality of back-end servers so as to authenticate the client to the plurality of servers for implementation of the client request on behalf of the client.

2. The computer program product according to claim 1, wherein the computer readable program code that obtains by a middle tier server, a common nonce, comprises:

computer readable program code that obtains the pre-nonce contributions from the plurality of servers;

computer readable program code that combines the pre-nonce contributions to provide a single pre-nonce token; and computer readable program code that provides the common nonce based on the pre-nonce token.

3. The computer program product according to claim 2, wherein the computer readable program code that obtains the pre-nonce contributions comprises:

computer readable program code that encrypts authenticated requests that request a pre-nonce contribution from each of the plurality of servers, where the authenticated requests include at least one of an identification of a source of the request, a time stamp and a random number;

computer readable program code that sends the authenticated requests to the plurality of servers; and computer readable program code that receives the pre-nonce contributions from the plurality of servers.

4. The computer program product according to claim 2, wherein the pre-nonce contributions include at least one of an identification of a server of the plurality of servers and a random number.

5. The computer program product according to claim 2, wherein the computer readable program code that combines the pre-nonce contributions to provide a single pre-nonce token comprises computer readable program code that concatenates the pre-nonce contributions.

6. The computer program product according to claim 2, wherein the computer readable program code that provides the common nonce based on the pre-nonce token comprises computer readable program code that reduces the pre-nonce token to provide the common nonce by hashing the pre-nonce token utilizing a one-way hash function so as to provide the common nonce.

7. The computer program product according to claim 2, wherein the pre-nonce contributions are signed with a signature corresponding to a server from which the pre-nonce contribution was obtained, further comprising:
computer readable program code that incorporating the signatures in the pre-nonce token.

8. The computer program product according to claim 7, further comprising computer readable program code that authenticates the signatures of the pre-nonce contributions and rejects pre-nonce contributions for which the digital signature is not authentic.

9. The computer program product according to claim 2, further comprising:
computer readable program code that receives a transaction identification from a trusted server of the plurality of servers;
computer readable program code that associates the transaction identification with the common nonce; and
computer readable program code that tracks use of the common nonce based on the transaction identification.

10. The computer program product according to claim 1, wherein the computer readable program code that obtains by a middle tier server, a common nonce comprises:
computer readable program code that obtains the common nonce from a party trusted by the middle-tier server and the plurality of servers, the common nonce being signed by the trusted party; and
computer readable program code that verifies the signature of the common nonce is the signature of the trusted party.

11. A system for impersonating a client to a plurality of servers, comprising:
a middle tier server in data communication with a plurality of back-end servers, said middle tier server having a processor, memory and program code resident in the memory, where the program code resident in the memory is executable by the processor to impersonate a client to a plurality of servers by executing code configured to:
obtain by a middle tier server, a common nonce that is created based at least in part upon a pre-nonce contribution from each of a plurality of back-end servers, wherein the common nonce is generated from an entity other than the client that the middle tier server is to impersonate or the plurality of back-end servers that the middle tier server is to interact with on behalf of the client;
receive by the middle tier server, a request from the client for a transaction with at least one of the plurality of back-end servers;
provide the common nonce from the middle tier server to the client;
receive the common nonce signed by the client with the client's digital signature at the middle-tier server; and
impersonate the client by the middle tier server interacting with a selected one of the plurality of back-end servers for implementation of the client request on behalf of the client by providing the signed common nonce and the client request from the middle tier server to at least one of the plurality of back-end servers so as to authenticate the client to the plurality of servers for implementation of the client request on behalf of the client.

12. The system according to claim 11, wherein the program code resident in the memory to obtain by a middle tier server, a common nonce, comprises program code resident in the memory to:
obtain the pre-nonce contributions from the plurality of servers;
combine the pre-nonce contributions to provide a single pre-nonce token; and
provide the common nonce based on the pre-nonce token.

13. The system according to claim 12, wherein the program code resident in the memory to obtain the pre-nonce contributions comprises program code resident in the memory to:
encrypt authenticated requests that request a pre-nonce contribution from each of the plurality of servers, where the authenticated requests include at least one of an identification of a source of the request, a time stamp and a random number;
send the authenticated requests to the plurality of servers; and
receive the pre-nonce contributions from the plurality of servers.

14. The system according to claim 12, wherein the pre-nonce contributions include at least one of an identification of a server of the plurality of servers and a random number.

15. The system according to claim 12, wherein the program code resident in the memory to combine the pre-nonce contributions to provide a single pre-nonce token comprises program code resident in the memory to concatenate the pre-nonce contributions.

16. The system according to claim 12, wherein the program code resident in the memory to provide the common nonce based on the pre-nonce token comprises program code resident in the memory to reduce the pre-nonce token to provide the common nonce by hashing the pre-nonce token utilizing a one-way hash function so as to provide the common nonce.

17. The system according to claim 12, wherein the pre-nonce contributions are signed with a signature corresponding to a server from which the pre-nonce contribution was obtained, further comprising:
program code resident in the memory to incorporate the signatures in the pre-nonce token.

18. The system according to claim 17, further comprising program code resident in the memory to authenticate the signatures of the pre-nonce contributions and rejects pre-nonce contributions for which the digital signature is not authentic.

19. The system according to claim 12, further comprising:
program code resident in the memory to receive a transaction identification from a trusted server of the plurality of servers;
program code resident in the memory to associate the transaction identification with the common nonce; and
program code resident in the memory to track use of the common nonce based on the transaction identification.

20. The system according to claim 11, wherein the program code resident in the memory to obtain by a middle tier server, a common nonce, comprises program code resident in the memory to:
obtain the common nonce from a party trusted by the middle-tier server and the plurality of servers, the common nonce being signed by the trusted party; and
verify the signature of the common nonce is the signature of the trusted party.

* * * * *